United States Patent
Taniguchi

(10) Patent No.: US 11,277,403 B2
(45) Date of Patent: Mar. 15, 2022

(54) INTERFACE MODULE, NETWORK DEVICE, AND NETWORK SYSTEM

(71) Applicant: Yokogawa Electric Corporation, Tokyo (JP)

(72) Inventor: Koichi Taniguchi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 287 days.

(21) Appl. No.: 16/525,622

(22) Filed: Jul. 30, 2019

(65) Prior Publication Data
US 2020/0045040 A1 Feb. 6, 2020

(30) Foreign Application Priority Data
Jul. 31, 2018 (JP) .............................. JP2018-143885

(51) Int. Cl.
*H04L 29/06* (2006.01)
*H04L 67/306* (2022.01)
(Continued)

(52) U.S. Cl.
CPC ........ *H04L 63/0853* (2013.01); *G06F 3/1238* (2013.01); *H04L 63/0861* (2013.01);
(Continued)

(58) Field of Classification Search
None
See application file for complete search history.

(56) References Cited

U.S. PATENT DOCUMENTS 10,003,160 B2 * 6/2018 Wu ..................... H01R 13/646
11,012,856 B2 * 5/2021 Ito ....................... H04W 12/047
(Continued)

FOREIGN PATENT DOCUMENTS

JP       2015118665 A     6/2015
JP         5911082 B1     4/2016
(Continued)

OTHER PUBLICATIONS

Office Action issued for counterpart Japanese Application No. 2018-143885, issued by the Japan Patent Office dated Jul. 16, 2019 (drafted on Jul. 9, 2019).
(Continued)

*Primary Examiner* — Lashonda T Jacobs

(57) ABSTRACT

Since such service providing systems are constructed through cooperation among cloud computers, communication networks, and device provides, they cannot be constructed easily. An interface module is provided, the interface module being configured to be disconnectably connected to an application module having at least one of a sensor, an actuator, an input port, an output port, an input/output port, and a user interface, and including: an interface module-side communication connector configured to be disconnectably connected to a communication connector provided to the application module; a network interface configured to be connected to a network; and a verification information storage unit that stores verification information for verifying the interface module connected to the network as an interface module for a preset particular tenant among a plurality of tenants of a server computing system configured to be connected to the network.

14 Claims, 10 Drawing Sheets

(51) Int. Cl.
*G06F 3/12* (2006.01)
*G06F 21/60* (2013.01)

(52) U.S. Cl.
CPC ............ *H04L 63/10* (2013.01); *H04L 63/12* (2013.01); *H04L 67/306* (2013.01); *G06F 3/1288* (2013.01); *G06F 21/608* (2013.01)

(56) References Cited

U.S. PATENT DOCUMENTS

| | | | |
|---|---|---|---|
| 11,031,963 B2* | 6/2021 | Sasaki | ................ B60R 16/0239 |
| 2010/0257228 A1 | 10/2010 | Staggs | |
| 2013/0312067 A1 | 11/2013 | Takao | |
| 2017/0286465 A1* | 10/2017 | Venkatesh | ............... G06F 16/00 |
| 2017/0310685 A1* | 10/2017 | Zhao | ....................... G06F 21/35 |
| 2018/0314470 A1* | 11/2018 | Liao | ..................... G06F 3/1238 |
| 2019/0004753 A1* | 1/2019 | Chu | ..................... G06F 3/1239 |

FOREIGN PATENT DOCUMENTS

| | | |
|---|---|---|
| JP | 2016144186 A | 8/2016 |
| JP | 2018516505 A | 6/2018 |
| WO | 2017182343 A1 | 10/2017 |

OTHER PUBLICATIONS

Extended European Search Report for counterpart European Application No. 19189101.9, issued by the European Patent Office dated Oct. 18, 2019.

* cited by examiner

INTERFACE MODULE, NETWORK DEVICE, AND NETWORK SYSTEM

The contents of the following Japanese patent application are incorporated herein by reference:

2018-143885 filed in JP on Jul. 31, 2018.

BACKGROUND

1. Technical Field

The present invention relates to an interface module, a network device, and a network system.

2. Related Art

Conventional facilities such as plants are controlled by a process control system (PCS) that includes devices that are installed in sections of a facility, and perform any of measurement, operation, input/output and the like (e.g., sensors, actuators, relay devices, etc.), and a control apparatus that controls these devices. In addition, in various fields other than the industrial field also, systems to perform measurement, monitoring and the like using distributedly arranged numerous sensors and the like are used. In recent years, the Internet of Things (IoT) and the Industrial IoT (IIoT) have drawn attention, systems like those explained above are increasingly deployed as cloud systems, and service providing systems each including a cloud computer, a communication network, and a plurality of devices are constructed.

Patent Literature 1 discloses a system and method related to use of cloud computing in industrial applications.

Patent Literature 1: Japanese Translation of PCT International Application Publication No. 2012-523038

Since such service providing systems are constructed through cooperation among cloud computers, communication networks, and device provides, they cannot be constructed easily.

SUMMARY

In order to solve the drawbacks explained above, a first aspect of the present invention provides an interface module configured to be disconnectably connected to an application module having at least one of a sensor, an actuator, an input port, an output port, an input/output port, and a user interface.

The interface module may include an interface module-side communication connector configured to be disconnectably connected to an application module-side communication connector provided to the application module. The interface module may include a network interface configured to be connected to a network. The interface module may include a verification information storage unit that stores verification information for verifying the interface module connected to the network as an interface module for a preset particular tenant among a plurality of tenants of a server computing system configured to be connected to the network.

The interface module may further include a verification processing unit that, upon connection of the interface module to the network while the interface module is not verified by the server computing system, transmits a verification request of the interface module to the server computing system, and makes the interface module verified by the server computing system.

Upon successful verification of the interface module by the server computing system, the network interface may receive a connection key to be used for communication for making the application module used as an application module for the particular tenant of the server computing system. The interface module may further comprise a connection key storage unit that stores the connection key.

The interface module may further include an identification information providing unit that is provided to a body or an accessory of the interface module, and provides identification information about the interface module in such a manner that a terminal that activates the interface module as the interface module for the particular tenant can acquire the identification information. The identification information providing unit may be a code label having thereon a printed code including the identification information.

The interface module may further include an interface module case that mates with an application module case provided to the application module to connect the application module to the interface module.

Circumferential shapes of connection surfaces of the interface module case and the application module case may be identical.

The interface module may include an interface module-side power source connector that is configured to be disconnectably connected to an application module-side power source connector provided to the application module, and enable supply of electrical power between the application module and the interface module.

A second aspect of the present invention provides a network device. The network device may include the interface module according to the first aspect. The network device may include the application module that can be connected to the interface module.

The application module may have an input/output connector for performing communication directly with the application module bypassing the interface module.

The application module may have an attachment surface on a surface opposite to a surface on which the application module is connected with the interface module, the attachment surface being a surface for attaching the application module to an installation location.

The application module may have an application module case. The application module may have an attachment tap provided with the attachment surface. The application module may have a seat that is interposed between the attachment tap and the application module case, and fixes the attachment tap to the application module case.

A magnet, a threaded hole, or a double-sided tape for attaching the application module to an installation location may be provided at the attachment surface.

A third aspect of the present invention provides a network system. The network system may include a plurality of interface modules, each of which is the interface module according to the first aspect. The network system may include the server computing system configured to be connected to each of the plurality of interface modules via the network.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
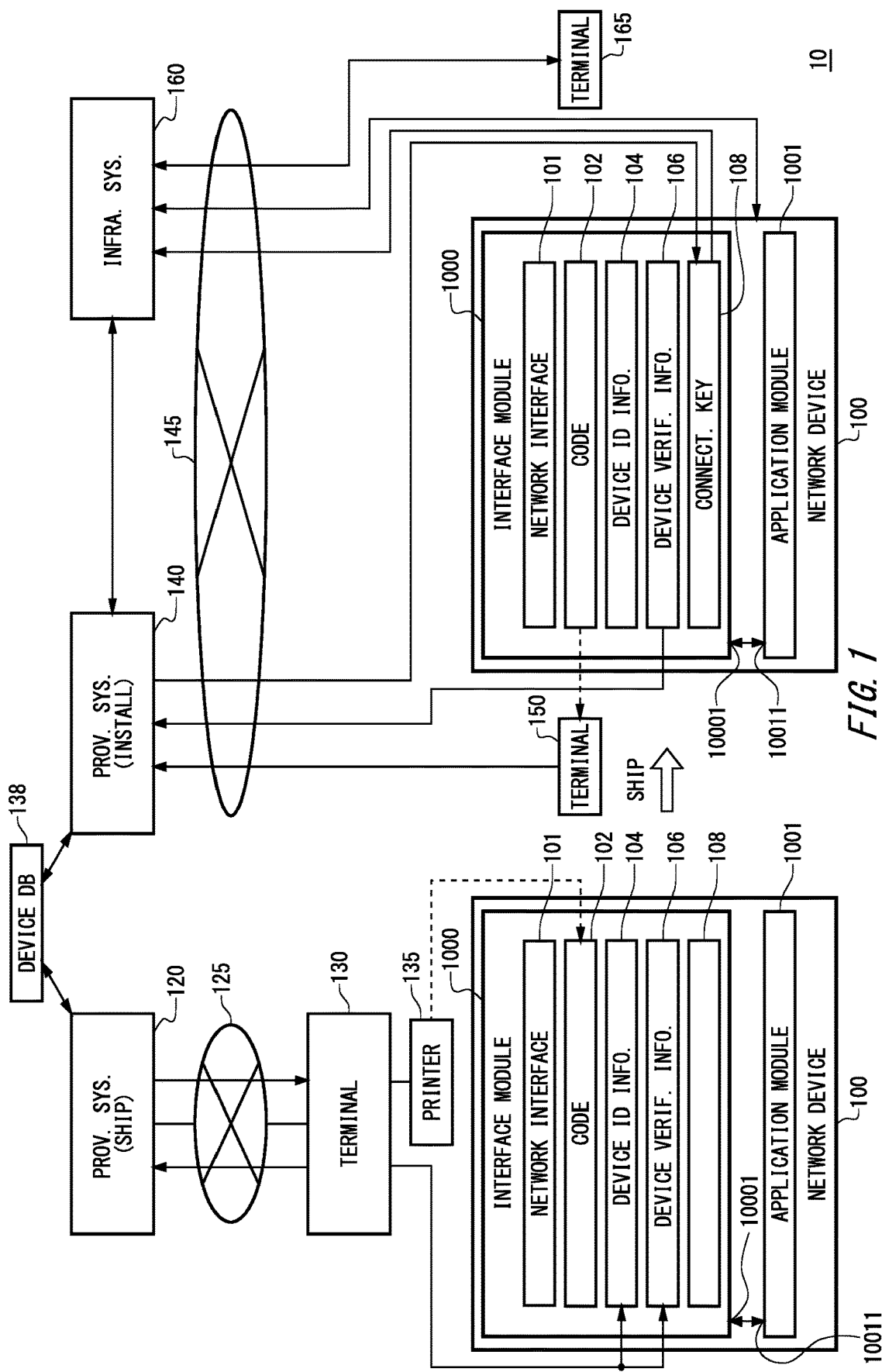
FIG. 1 illustrates a device provisioning environment 10 according to the present embodiment.

FIG. 1 illustrates a device provisioning environment 10 according to the present embodiment. In the present embodiment, the device provisioning environment 10 includes: a provisioning system 120 that performs pre-shipment setting processes of each interface module 1000 of a plurality of network devices 100, and a provisioning system 140 that performs installation-site setting processes of each of a plurality of interface modules 1000, and the device provisioning environment 10 enables a simple and secure connection of an interface module 1000 to an infrastructure system 160 which is a cloud computer, a fog computer, or the like (hereinafter, referred to as a "cloud computer or the like").

The device provisioning environment 10 includes: the provisioning system 120, a network 125, a terminal 130 and a printer 135 for performing pre-shipment setting/preparation processes of interface modules 1000; a device DB 138 that stores device information related to the interface modules 1000; the provisioning system 140 and a terminal 150 for performing installation-site setting processes of an interface module 1000 delivered to a user; and the infrastructure system 160 and a terminal 165 for constructing a cloud computing system or a fog computing system (hereinafter, referred to as a "cloud computing system or the like") that performs monitoring, control, or the like of each network device 100 including an interface module 1000 after installation.

The network device 100 is a device such as a water level gauge, a thermometer, a barometer, a remote switch or the like configured to be connected to a network 145 such as the internet, a wide area network, a local area network, and/or a mobile network, and has an application module 1001, and the interface module 1000.

The application module 1001 and the interface module 1000 are configured to be disconnectably connected by a communication connector 10011 provided to the application module 1001 and a communication connector 10001 provided to the interface module 1000. The application module 1001 and the interface module 1000 may be connected integrally, and shipped as the network device 100, or may be shipped separately. The application module 1001 and the interface module 1000 may be manufactured by the same manufacturer, or may be manufactured by different manufacturers. For example, the application module 1001 may be manufactured by a user who purchased the interface module 1000.

The application module 1001 has at least one of a sensor, an actuator, an input port, an output port, an input/output port, and a user interface.

The interface module 1000 connects the application module 1001 connected to itself to a network. The interface module 1000 may be connectable alternatively to each of multiple types of application modules 1001. In this case, the communication connector 10001 and communication connectors 10011 of the various types of application modules 1001 may communicate by using a common communication protocol. The communication protocol may be a serial communication protocol, and for example they may communicate AT commands or the like by using a UART (Universal Asynchronous Receiver Transmitter). The interface module 1000 includes: a network interface 101 configured to be connected to a network; a code label 102 having thereon a printed code including device identification information that is provided by the provisioning system 120, and is unique to the delivery target interface module 1000; an identification information storage area 104 that stores the device identification information; a verification information storage area 106 that stores verification information that is provided by the provisioning system 120, and is for verifying the interface module 1000 connected to the network 145 at the delivery location as an interface module for a preset particular tenant among a plurality of tenants that are to receive services provided by the infrastructure system 160; and a connection key storage area 108 that stores a connection key for the delivery target interface module 1000 to be connected to the infrastructure system 160. Here, tenants are enterprises, departments within enterprises, or other account groups set for user organizations that have concluded contracts for utilization of services. In the present embodiment, a user organization corresponding to each tenant purchases and uses an interface module 1000 or a network device 100 in order to utilize a service of the infrastructure system 160. Note that an account may be a user included in a tenant.

The provisioning system 120 is a computer system for providing a provisioning service that enables a simple and secure connection of a delivery target interface module 1000 to the infrastructure system 160 by performing pre-setting processes of the delivery target interface module 1000 via the network 125 before delivery of the delivery target interface module 1000 configured to be connected to the network 145 at the delivery location. The provisioning system 120 is operated by a service provider that provides this provisioning service. The provisioning system 120 may be a cloud computing system or the like, and may be a server computing system realized by one or more server computers or the like. In the present embodiment, this service provider is different from a provider such as a manufacturer or a seller of the network device 100. Instead, this service provider may be the same as the provider of the network device 100. In addition, this service provider may be the same as or different from a service provider that provides services by the infrastructure system 160. Note that the infrastructure system 160 according to the present embodiment provides provider identification information unique to each provider in order to provide provisioning services about a network device 100 that each of a plurality of providers manufactures or sells.

The provisioning system 120 provides a service of setting, for a delivery target interface module 1000: unique device identification information by which the infrastructure system 160 can identify the delivery target interface module 1000; device verification information for verifying the delivery target interface module 1000 connected to a network at the delivery location; and other necessary information, before delivery of the delivery target interface module 1000 in response to a request from the terminal 130 of a provider of a delivery target network device 100 configured to be connected to the network 145 at the delivery location.

The network 125 connects the provisioning system 120 and the terminal 130 through a wired connection or a wireless connection. The network 125 may be the internet, a wide area network, a local area network or the like, and may include a mobile network.

The terminal 130 is a terminal used by the provider of a delivery target interface module 1000, and functions as an apparatus for performing setting processes of the delivery target interface module 1000. The terminal 130 may be a computer such as a PC (personal computer), a tablet computer, a smartphone, a workstation, a server computer, or a general purpose computer, and may be a computer system constituted by a plurality of interconnected computers. The terminal 130 is used for utilizing a provisioning service provided by the provisioning system 120, and sets device identification information and device verification information provided by the provisioning system 120 in the identification information storage area 104 and verification information storage area 106 of the delivery target interface module 1000.

The printer 135 is connected to the terminal 130 through a wired connection or a wireless connection, and, in response to an instruction from the terminal 130, prints a code including device identification information on a sticker or the like, for example. In the present embodiment, the code label 102 having thereon a printed code is pasted onto the delivery target interface module 1000.

The device DB 138 stores device information related to a plurality of interface modules 1000 which are targets of provisioning services. The device information stored in the device DB 138 includes device identification information, and device verification information set by a verification information generating unit 425. The device information may include any of pieces of information included in device information received from the terminal 130 such as provider identification information, a serial number, and model identification information such as a model name. In addition, the device information may include a public key of a delivery target interface module 1000 to be used for PKI (Public Key Infrastructure) verification of the delivery target interface module 1000 for the provisioning system 140, and encrypted communication between the delivery target interface module 1000 and another instrument, or the like. The device DB 138 may be able to communicate with the provisioning system 120 and the provisioning system 140.

The provisioning system 140 is a computer system owned by a service provider that provides a provisioning service of connecting an interface module 1000 to the infrastructure system 160 simply and securely. The provisioning system 140 may be a cloud computing system or the like, and may be a server computing system realized by one or more server computers or the like. In the present embodiment, the service provider that provides a service by the provisioning system 120 (a service provider of a shipment provisioning service), and the service provider that provides a service by the provisioning system 140 (a service provider of an installation provisioning service) are the same, and are different from the provider of the interface module 1000. Instead, these service providers and the provider of the interface module 1000 may be the same, and the service provider of the shipment provisioning service, and the service provider of the installation provisioning service may be different. Note that the provisioning system 140 according to the present embodiment provides unique tenant identification information to each of tenants that purchases and uses a service of the infrastructure system 160.

The provisioning system 140 receives, from the terminal 150, an activation request of a setter who performs setting processes of a delivery target interface module 1000 at the delivery location, and uses device verification information to verify the delivery target interface module 1000 connected to the network 145 at the delivery location as an interface module for a particular tenant. Then, provided that verification was successful, the provisioning system 140 registers the interface module 1000 for at least one service to be utilized by a particular tenant among services provided by the infrastructure system 160, and provides a connection key for connection to the infrastructure system 160 to the delivery target interface module 1000. The connection key provided by the provisioning system 140 is stored in the connection key storage area 108 in the network device 100.

The network 145 establishes a wireless or wired connection between the interface module 1000 of the network device 100, the provisioning system 140, the terminal 150, the infrastructure system 160, and the terminal 165. The network 145 may be the internet, a wide area network, a local area network or the like, and may include a mobile network. Although, in this figure, the network 125 and the network 145 are separate networks, instead, the network 125 and the network 145 may be a single network.

The terminal 150 is a terminal used by a setter who performs setting processes of the delivery target interface module 1000 at the delivery location of the delivery target interface module 1000. This setter is, for example, a user belonging to a user organization (tenant) at which the network device 100 is used, or a member of an installation service provider or the like. In the present embodiment, the terminal 150 is, for example, a smartphone, a tablet computer, a PC, or the like. The terminal 150 is used for utilizing a provisioning service provided by the provisioning system 140, acquires device identification information from the code label 102 of the delivery target interface module 1000, or the like, and requests the provisioning system 140 to activate the delivery target interface module 1000.

The infrastructure system 160 is a computing system that functions as a service providing system to provide a service of constructing a network system constituted by a plurality of interconnected network devices 100 including delivery target interface modules 1000 (network system construction service). The infrastructure system 160 may be a cloud computing system or the like, and may be a server computing system realized by one or more server computers or the like. The network system constructed by using the infrastructure system 160 is a device network such as an IoT or IIoT system, for example. The infrastructure system 160 functions as a cloud computer that controls the plurality of network devices 100 in the network system, or the like. The infrastructure system 160 acquires sense data from one or more network devices 100 equipped with sensors or the like, provides an interface to present information to a user, a monitor or the like via the terminal 165, and/or performs control computation according to the sense data, and performs information processing such as control of network devices 100 equipped with actuators or the like. In addition, the infrastructure system 160 provides an application environment where a user or the like creates, via the terminal 165, an application to perform a process on data from a network device 100 or data to be transmitted to a network device 100. The infrastructure system 160 may be provided with resources to be shared for use by a plurality of tenants, and virtually provide an independent service for each tenant, and each tenant may not be able to utilize data of other tenants without permission.

The terminal 165 is a terminal used by a user of a network system connecting a plurality of network devices 100. The terminal 165 may be a computer such as a PC (personal computer), a tablet computer, a smartphone, a workstation, a server computer, or a general purpose computer, and may be a computer system constituted by a plurality of interconnected computers. The terminal 165 is connected to the infrastructure system 160 via the network 145, and is used for utilizing a network system construction service provided by the infrastructure system 160.

According to the device provisioning environment 10 illustrated above, the interface module 1000 configured to be disconnectably connected to the application module 1001 stores device verification information for verifying the interface module 1000 as an interface module for a particular tenant. Accordingly, upon successful verification of the interface module 1000 as an interface module for a particular tenant by the provisioning system 140, the application module 1001 configured to be connected to the interface module 1000 is also verified as an application module for the same particular tenant. Therefore, by attaching any application module 1001 to the interface module 1000, a user can make the application module 1001 verified as an application module for a particular tenant, complete a service providing system by the infrastructure system 160, and be provided with a service for which the particular tenant concluded a contract. In addition, since any application module 1001 can be used, development of an application module 1001 is facilitated. In addition, since any application module 1001 is automatically verified as an application module for a particular tenant by being attached to the interface module 1000, replacement of application modules 1001 is facilitated. In addition, since, for a service provider who uses the infrastructure system 160, the boundary of responsibility is set at between the interface module 1000 and the application module 1001, and it is not necessary to negotiate with the provider of the application module 1001 in construction of a service providing system, the service providing system can be constructed easily.

In addition, device identification information for connecting a delivery target interface module 1000 to the infrastructure system 160 or the like is set before shipment by utilizing a provisioning service provided by the provisioning system 120 such that setting processes of the delivery target interface module 1000 can be performed simply by a setter through the terminal 150 by utilizing a provisioning service provided by the provisioning system 140. Thereby, the device provisioning environment 10 can provide convenience of a plug-and-play or something similar to it for an interface module 1000 and furthermore a network device 100. In addition, the provisioning system 120 stores device verification information in an interface module 1000 before shipment, and the provisioning system 140 verifies the interface module 1000 by using the device verification information after delivery. Thereby, it becomes possible to prevent risk to the security of a network system that might result from an unauthorized connection of an interface module 1000 or a network device different from a delivery target interface module 1000 to the infrastructure system 160.

Figure 2:
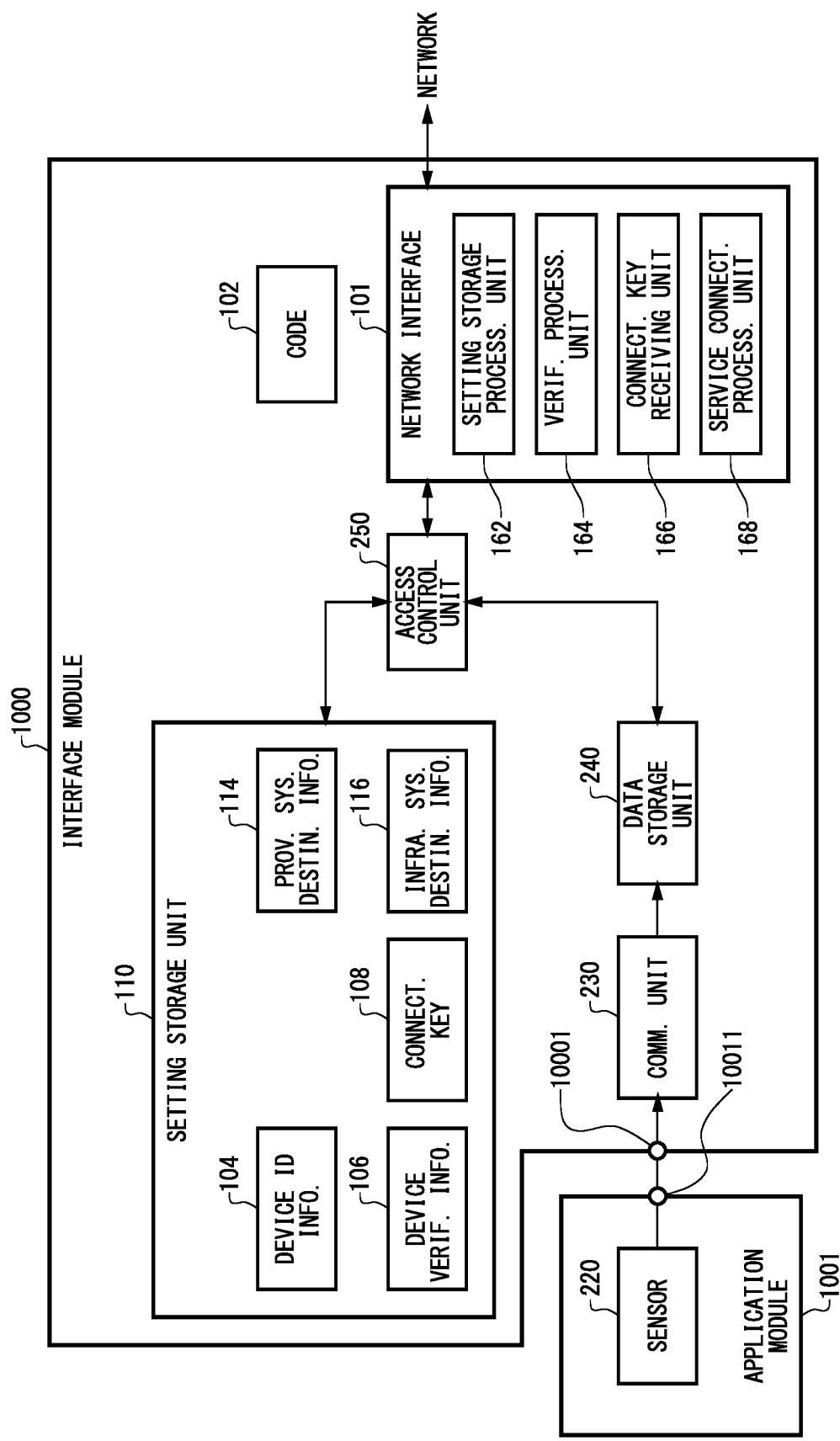
FIG. 2 illustrates an exemplary network device 100 according to the present embodiment.

FIG. 2 illustrates an exemplary network device 100 according to the present embodiment. The network device 100 has an application module 1001 and an interface module 1000 that are configured to be disconnectably connected by a communication connector 10011 and a communication connector 10001.

In the present embodiment, for example, the application module 1001 is a sensor module, and includes a sensor 220. The sensor 220 is a sensor that measures a physical quantity such as a temperature sensor, a humidity sensor, a flow rate sensor, a pressure sensor, a voltage sensor or a current sensor, for example. The application module 1001 may include two sensors 220 or more.

Instead, the application module may be a module to perform other functions. For example, the application module 1001 may be an actuator module having an actuator such as a fan or a motor. In addition, the application module 1001 may be a user interface module having at least one of a remote controller, a lamp, a display apparatus, or the like. In addition, the application module 1001 may be a relay module having at least one of an input port, an output port, and an input/output port (e.g., a USB port) configured to be connected to another instrument. Such another instrument to be connected may be at least one of: an image-capturing instrument such as a camera or a video camera that captures images of conditions within a facility or target objects; an instrument that reads a barcode or a two-dimensional code (e.g., a QR code (registered trademark)) pasted onto an instrument or the like; an audio instrument such as a microphone or a speaker that performs collection of abnormal sound and the like within a facility, issuance of alert sound and the like, or the like; a position detecting instrument that outputs information about the position of each instrument; and the like.

Note that the application module 1001 may further include at least one of: a storage unit that stores device information about the application module 1001; a clock unit that has a clock function, a user interface unit for performing input/output; and a power source unit that supplies electrical power to each functional unit. The device information about the application module 1001 may be, for example, provider identification information, a serial number, a model name, a function code, or the like.

The interface module 1000 includes a code label 102, a setting storage unit 110, a communication unit 230, a data storage unit 240, an access control unit 250, and a network interface 101. The interface module 1000 may further include at least one of: an antenna unit that is connected wirelessly to the network 145 (e.g., a chip antenna or a pattern antenna); a clock unit that has a clock function; a GPS unit that performs measurement; a user interface unit for performing input/output; and a power source unit that supplies electrical power to each functional unit.

The code label 102 is a label that is pasted onto the body or an accessory of the interface module 1000, and indicates a code obtained by encoding device identification information or the like. The code label 102 functions as a device identification information providing unit that provides the device identification information about the interface module 1000 such that the terminal 150 can acquire it. This code may be a barcode, a two-dimensional code, or the like, and may be any code such as a character string that the terminal 150 can read from an image. Instead, the interface module 1000 may have the device identification information or the like in a form that allows the terminal 150 to acquire it through a short-wireless communication or the like, that is, in the form of a contactless IC card or the like, for example.

The setting storage unit 110 stores information about the settings of the interface module 1000. The setting storage unit 110 has an identification information storage area 104, a provisioning system destination information storage area 114, a verification information storage area 106, a connection key storage area 108, and an infrastructure system destination information storage area 116. The identification information storage area 104 is an area where the device identification information about the interface module 1000 determined by the provisioning system 120 is stored before delivery of the interface module 1000, and functions as a device identification information storage unit.

The provisioning system destination information storage area 114 is an area where destination information about the provisioning system 140, that is, for example a URL or the like of the provisioning system 140 is stored before delivery of the interface module 1000, and functions as a destination information storage unit for the provisioning system 140.

The verification information storage area 106 is an area where device verification information for verifying the interface module 1000 connected to the network 145 as a device dedicated for a particular tenant of the infrastructure system 160 is stored, and functions as a verification information storage unit. The connection key storage area 108 is an area where a connection key for connecting the interface module 1000 to the infrastructure system 160 is stored, and functions as a connection key storage unit. The connection key is to be used for communication for making the interface module 1000 use the application module 1001 as an application module for the particular tenant mentioned above, and different interface modules 1000 may have different connection keys. The infrastructure system destination information storage area 116 is an area where destination information about the infrastructure system 160 is stored, and functions as a destination information storage unit for the infrastructure system 160. Among the storage areas of the setting storage unit 110, at least the verification information storage area 106 and the connection key storage area 108 may be secure storage areas where unauthorized reading is not allowed.

The communication unit 230 is configured to be connected to the application module 1001 such that communication is possible therebetween, and the communication unit 230 performs communication corresponding to the functions of the application module 1001. For example, if an application module 1001 which is a sensor module is connected to the communication unit 230, the communication unit 230 receives signals from the sensor 220, and converts the signals into sense data. For example, the communication unit 230 obtains sense data by converting analog signals input from the sensor 220 into digital signals. In addition, if an application module 1001 which is an actuator module is connected to the communication unit 230, the communication unit 230 transmits control signals to drive the actuator. The control signals may be supplied from the infrastructure system 160 or the like via the network interface 101. In addition, if an application module 1001 which is a relay module is connected to the communication unit 230, the communication unit 230 performs at least one of transmission and reception to and from the application module 1001. The data storage unit 240 stores data received by the communication unit 230, or data to be transmitted by the communication unit 230. For example, the data storage unit 240 may store the sense data received from the sensor 220 in a buffer.

Upon being requested by the network interface 101, the access control unit 250 accesses data in the setting storage unit 110 and the data storage unit 240, and provides the data to the network interface 101. In addition, upon being requested by the network interface 101, the access control unit 250 writes various types of data in the setting storage unit 110 or the data storage unit 240, or reads in data from the setting storage unit 110 or the data storage unit 240.

The network interface 101 is configured to be connected to networks such as the network 125 and the network 145, and, in response to a request or the like received via a network, instruct the access control unit 250 to access the setting storage unit 110 or the data storage unit 240. The network interface 101 may be connected with the network 125, the network 145, and the like through any of an analog communication and a digital communication. The network interface 101 may be able to be connected to: a communication line such as an Ethernet (registered trademark) communication line; a mobile line such as a 3G line, a 4G line, or an LTE line; a communication line for the IoT such as LoRa; or the like.

The network interface 101 has a setting storage processing unit 162, a verification processing unit 164, a connection key receiving unit 166, and a service connection processing unit 168. The setting storage processing unit 162 receives information to be set for the interface module 1000 before shipment, such as device identification information, destination information about the provisioning system 140, and device verification information, from the terminal 130 while the network device 100 (or the interface module 1000) is kept connected to the terminal 130 before delivery, and stores the information in the identification information storage area 104, the provisioning system destination information storage area 114, the verification information storage area 106, and the like. Upon connection of the interface module 1000 to the network 145 while the interface module 1000 is not verified by the provisioning system 140, the verification processing unit 164 transmits a verification request of the interface module 1000 to the provisioning system 140, and makes the interface module 1000 verified by the provisioning system 140. For example, the verification processing unit 164 uses device verification information stored in the verification information storage area 106 to make the interface module 1000 verified by the provisioning system 140. Upon successful verification of the interface module 1000 by the provisioning system 140, the connection key receiving unit 166 receives from the provisioning system 140 a connection key for accessing the infrastructure system 160, and stores the connection key in the connection key storage area 108. The service connection processing unit 168 uses the connection key stored in the connection key storage area 108 to be connected to the infrastructure system 160 that provides a network system construction service.

According to the network device 100 illustrated above, device verification information provided from the provisioning system 120 before shipment of the network device 100 (or interface module 1000) is stored in the verification information storage area 106 in the interface module 1000, and it is possible to make the interface module 1000 verified by the infrastructure system 160 at the time of installation of the network device 100 (or the interface module 1000) by using the stored device verification information. Accordingly, the interface module 1000, and furthermore the network device 100, can be connected to the provisioning system 140 and the infrastructure system 160 only if they are genuine articles ordered by a user and set by a provider, and another interface module or network device which is an unauthorized article having device identification information that is given to and stolen from the interface module 1000, and set for the unauthorized article or an unauthorized article obtained in another manner can never be connected to the provisioning system 140 and the infrastructure system 160.

In addition, since identification information about the interface module 1000 is provided from the body or an accessory of the interface module 1000 in such a manner that it can be acquired by the terminal 150, activation of the interface module 1000 by the terminal 150 can be facilitated.

In addition, since each interface module 1000 has unique device identification information and connection key, at the time of replacement, by executing activation of a new interface module 1000 that has replaced an old interface module 1000 (see FIG. 5 and FIG. 7 mentioned below), it becomes easy to restart communication with the infrastructure system 160, and furthermore to restart utilization of a service provided by the infrastructure system 160.

Figure 3:
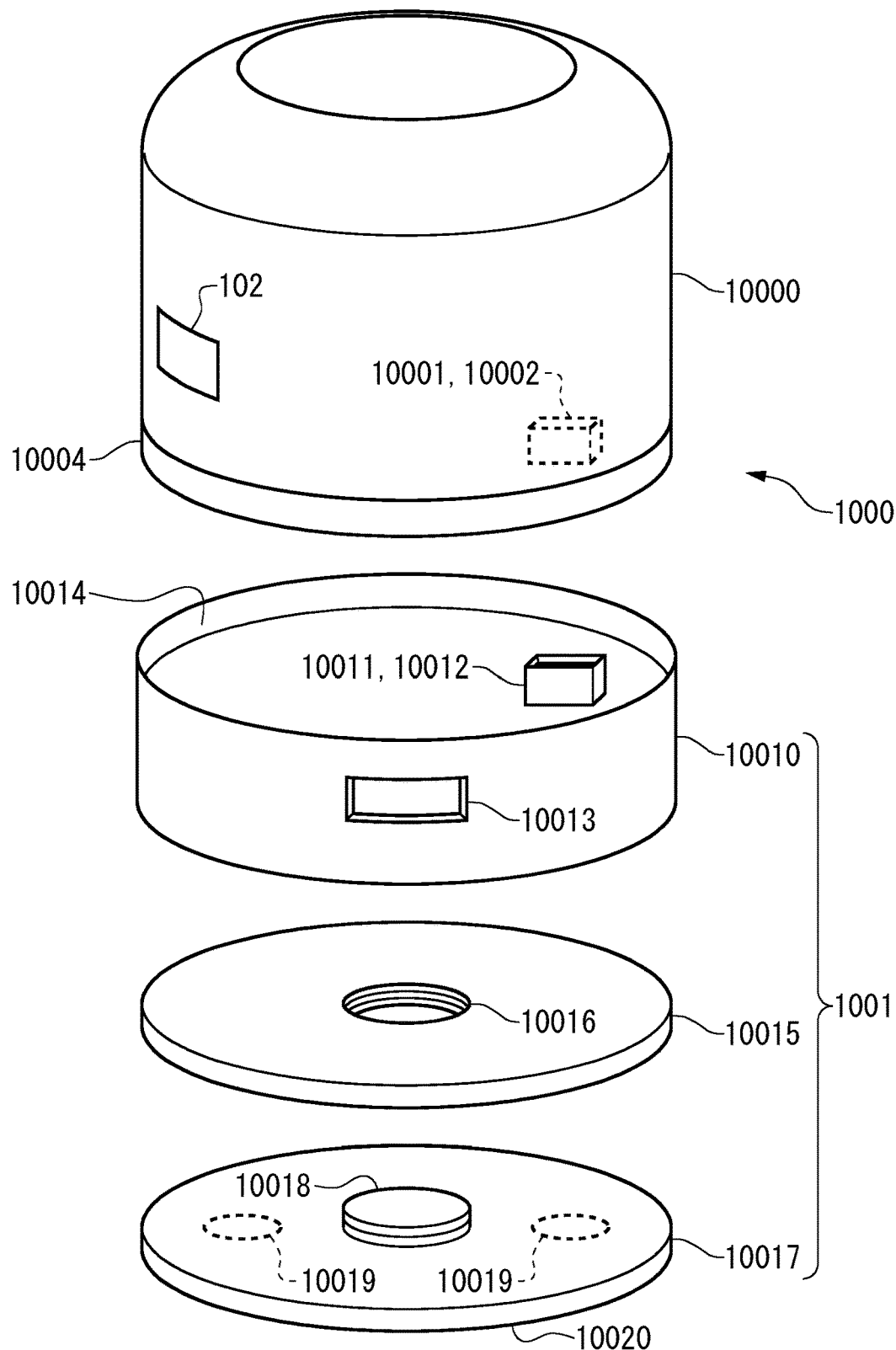
FIG. 3 is an exploded perspective view illustrating a network device 100 according to an embodiment.

FIG. 3 is an exploded perspective view illustrating the network device 100 according to the present embodiment. The interface module 1000 of the network device 100 has a case 10000 that houses each functional unit therein, and the application module 1001 has: a case 10010 that houses each functional unit therein; and a seat 10015 and an attachment tap 10017. Note that the seat 10015 and the attachment tap 10017 are not necessarily provided to the application module 1001.

The cases 10000, 10010 have communication connectors 10001, 10011 that are configured to be disconnectably connected, and enable wired communication. In addition, the cases 10000, 10010 have power source connectors 10002, 10012 that are configured to be disconnectably connected, and enable power supply between the interface module 1000 and the application module 1001. The power supply via the power source connectors 10002, 10012 may be performed in any direction between the interface module 1000 and the application module 1001. Note that although in the present embodiment, for example, a single connector is illustrated as serving as both the communication connector 10001 and the power source connector 10002, and a single connector is illustrated as serving as both the communication connector 10011 and the power source connector 10012, each of them may be a separate connector. In addition, at least one of the cases 10000, 10010 may further have a power supply connector for receiving power supply from the outside.

The cases 10000, 10010 mate with each other to thereby connect the interface module 1000 with the application module 1001. In the present embodiment, for example, a protruding portion 10004 at an end portion (the lower end portion in the figure) of the case 10000 mates with an opening portion 10014 at an end portion (the upper end portion in the figure) of the case 10010. Screw threads and screw grooves may be provided on the inner circumference surface of the opening portion 10014, and the outer circumference surface of the protruding portion 10004, respectively. In addition to this, or instead, the opening portion 10014 and the protruding portion 10004 may be provided with seals. Here, in the present embodiment, for example, connecting the interface module 1000 with the application module 1001 means connecting them electrically. For example, the communication connectors 10001, 10011, and the power source connectors 10002, 10012 may be provided on the connection surfaces of the cases 10000, 10010, respectively, and, when the cases 10010, 10000 mated with each other, electrical connections may be established between the communication connectors 10001, 10011, and between the power source connectors 10002, 10012. In addition to this, or instead, connecting the interface module 1000 with the application module 1001 may mean connecting them physically. In this case, for example, the provider or user of the interface module 1000 and the application module 1001 may connect the connectors electrically, and then make the cases 10010, 10000 mate with each other to thereby connect the application module 1001 with the interface module 1000 physically.

The cases 10000, 10010 may have connection surfaces with identical circumferential shapes. For example, the cases 10000, 10010 are cylindrical in FIG. 3, and the circumferential shapes of their connection surfaces are circular. Note that that the circumferential shapes are identical may mean that the circumferential shapes are substantially identical, for example, that at least some parts of the circumferences have different shapes.

Here, the interface module 1000 illustrated in FIG. 3 has the code label 102 on the outer surface of the case 10000. The code label 102 may be provided on a surface which is different from the connection surface of the case 10000 at which the case 10000 is connected with the case 10010 such that the code label 102 can be read from the outside when the cases 10000, 10010 mated with each other. In addition, the application module 1001 has, at the case 10010, an input/output connector 10013 for performing communication directly with the application module 1001 bypassing the interface module 1000. The input/output connector 10013 may be a USB port, for example.

The seat 10015 is fixed to a surface of the case 10010 of the application module 1001 which surface is opposite to the case 10000 (the lower surface in the figure). The seat 10015 is a member for fixing the attachment tap 10017 to the case 10010, and for example has a threaded hole portion 10016 at its middle portion. Note that the seat 10015 may be provided integrally with the case 10010.

The attachment tap 10017 has a columnar threaded portion 10018 at its middle portion, and the threaded portion 10018 is screwed into the threaded hole portion 10016 of the seat 10015 to be thereby fixed to the case 10010. The attachment tap 10017 is a member for attaching the case 10010, and furthermore the network device 100, to their installation location, and has an attachment surface 10020 on a surface which is opposite to the seat 10015 (the lower surface in the figure). The attachment surface 10020 is provided with magnets 10019 for attaching the case 10010 to its installation location. Instead, the attachment surface 10020 may be provided with a threaded hole portion through which a screw is inserted for attachment of the case 10010 to its installation location, or may have a double-sided tape pasted onto it.

According to the network device 100 explained above, since the cases of the application module 1001 and the interface module 1000 are caused to mate with each other to thereby connect the application module 1001 with the interface module 1000, it becomes easier to establish a connection.

In addition, since the circumferential shapes of the connection surfaces of the case 10000, 10010 are identical, the connection surface of one case never extends beyond the connection surface of the other case. Therefore, it becomes possible to prevent occurrence of an adverse influence in communication between the application module 1001 and the interface module 1000 due to the connection surface of the one case being caught.

In addition, since the attachment surface 10020 is provided on a surface of the application module 1001 which surface is opposite to the interface module 1000, it is possible to easily attach the network device 100 to its installation location such that an adverse influence in communication by the interface module 1000 does not occur.

In addition, since power supply is possible between the interface module 1000 and the application module 1001, one of the interface module 1000 and the application module 1001 may be configured to receive power supply from the other, and thus downsizing becomes possible.

In addition, since the attachment tap 10017 provided with the magnets 10019 is fixed to the case 10000 via the seat 10015, the influence of magnet force of the magnet 10019 on the network device 100 can be reduced as compared to the case where the attachment tap 10017 is fixed directly to the case 10000.

Figure 4:
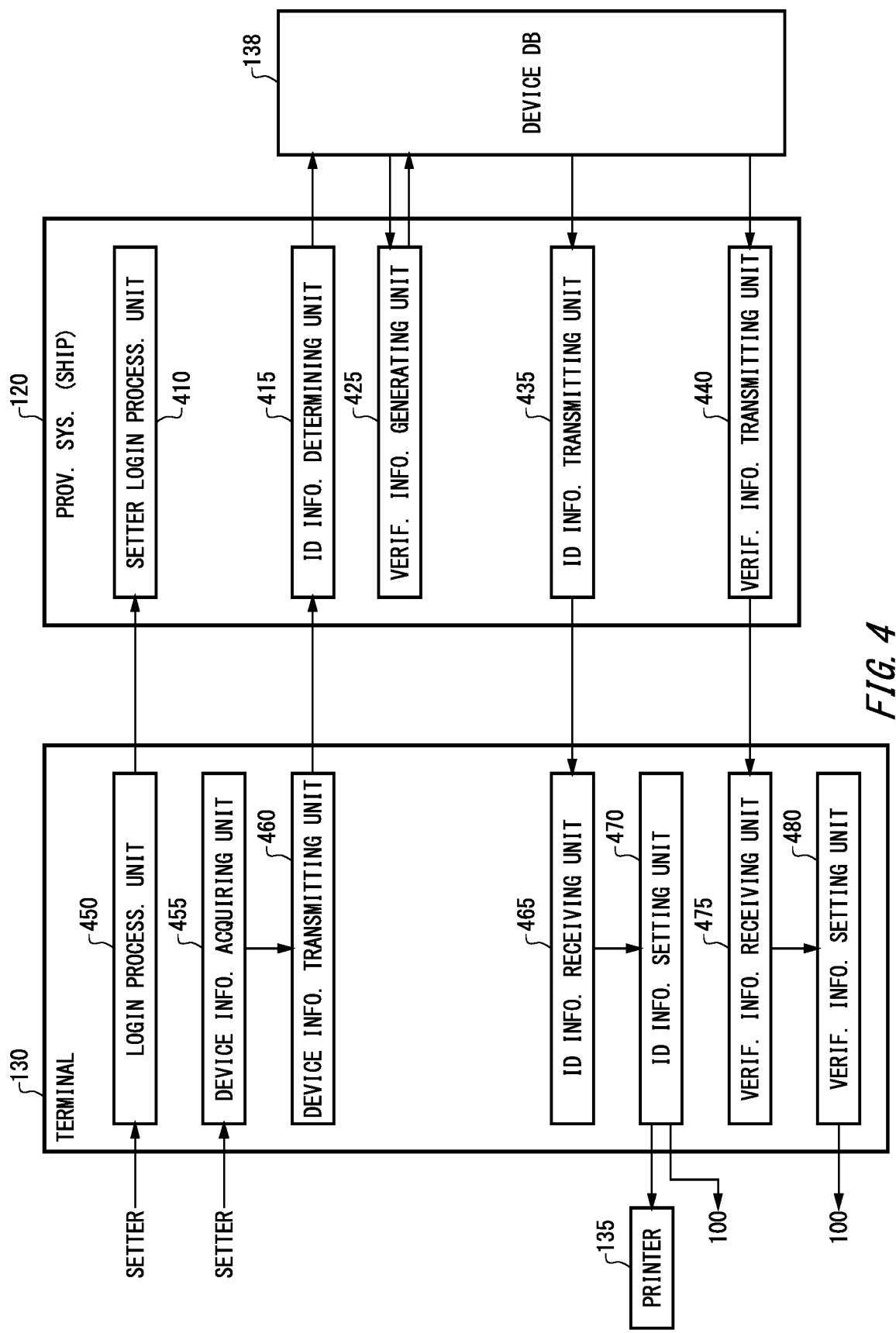
FIG. 4 illustrates the configurations of a provisioning system 120 and a terminal 130 according to the present embodiment.

FIG. 4 illustrates the configurations of the provisioning system 120 and the terminal 130 according to the present embodiment. The provisioning system 120 includes a setter login processing unit 410, an identification information determining unit 415, a verification information generating unit 425, an identification information transmitting unit 435, and a verification information transmitting unit 440.

The setter login processing unit 410 receives, from the terminal 130, a login request of a setter who is in charge of setting processes of the delivery target interface module 1000 before delivery of the delivery target interface module 1000. This setter may be someone who is in charge of setting processes of the delivery target interface module 1000 such as an employee of the provider of the delivery target interface module 1000, and the setter login processing unit 410 receives a login request from the terminal 130 for login to a user account belonging to the provider.

The identification information determining unit 415 receives device information related to the delivery target interface module 1000 which device information is acquired by the terminal 130 according to an instruction of the setter, before delivery of the delivery target interface module 1000, and determines device identification information. The identification information determining unit 415 adds the device identification information to the device information about the delivery target interface module 1000, and writes them in the device DB 138 to thereby register the delivery target interface module 1000 in the device DB 138.

Upon registration of the device information about the delivery target interface module 1000 in the device DB 138, the verification information generating unit 425 generates device verification information for verifying the delivery target interface module 1000 at its delivery location. The verification information generating unit 425 writes the generated device verification information in the device DB 138, and adds it to the device information about the delivery target interface module 1000.

The identification information transmitting unit 435 transmits the device identification information read out from the device DB 138 to the delivery target terminal 130, and makes the device identification information set as information that can be acquired from the body or an accessory of the delivery target interface module 1000 at its delivery location. The identification information transmitting unit 435 may encode the device identification information that is read out, and then transmit it to the delivery target terminal 130, or may transmit the device identification information without encoding it. In the present embodiment, the device identification information is supplied as encoded information from the terminal 130 to the printer 135 where the encoded information is printed out, and the setter pastes the printed material onto the body or an accessory of the delivery target interface module 1000. In addition, the identification information transmitting unit 435 transmits the device identification information about the delivery target interface module 1000, and destination information about the provisioning system 140 to the terminal 130, and makes them written in the identification information storage area 104 and provisioning system destination information storage area 114 in the delivery target interface module 1000.

The verification information transmitting unit 440 transmits the device verification information to the terminal 130, and makes it stored in the verification information storage area 106 of the delivery target interface module 1000. In addition, the verification information transmitting unit 440 transmits destination information about the infrastructure system 160 to the terminal 130, and makes it stored in the infrastructure system destination information storage area 116 of the delivery target interface module 1000.

The terminal 130 includes a login processing unit 450, a device information acquiring unit 455, a device information transmitting unit 460, an identification information receiving unit 465, an identification information setting unit 470, a verification information receiving unit 475, and a verification information setting unit 480. These functions may be realized by the terminal 130 performing processes of a Web page related to a provisioning service of the provisioning system 120.

The login processing unit 450 performs a process for login to the provisioning system 120 according to an instruction of a setter who manipulates the terminal 130. The device information acquiring unit 455 acquires the device information about the delivery target interface module 1000 while the setter is logged in. The device information transmitting unit 460 transmits the acquired device information to the identification information determining unit 415 in the provisioning system 120.

The identification information receiving unit 465 receives device identification information and the destination information about the provisioning system 140 from the identification information transmitting unit 435 of the provisioning system 120. The identification information receiving unit 465 according to the present embodiment receives the device identification information and the destination information about the provisioning system 140.

The identification information setting unit 470 sets device identification information for the delivery target interface module 1000 such that the device identification information can be acquired from the body or an accessory of the delivery target interface module 1000 at the delivery location. In the present embodiment, the identification information setting unit 470 makes a code of the device identification information printed on a label by the printer 135, and the setter pastes the code label 102 on the body of the delivery target interface module 1000. Note that, instead of printing the code label 102 in such a matter that the code label 102 can be pasted, the printer 135 may directly mark the code on the body of the delivery target interface module 1000 by laser marking or the like, or may directly print the code by ink-jet printing or the like. If the device identification information received by the identification information receiving unit 465 is not encoded, the identification information setting unit 470 may encode the device identification information. In addition, the identification information setting unit 470 receives the device identification information, and identification information about the provisioning system 140 from the provisioning system 120, and writes them in the identification information storage area 104, and provisioning system destination information storage area 114 in the delivery target interface module 1000.

The verification information receiving unit 475 receives device verification information from the provisioning system 120. The verification information setting unit 480 makes the received device verification information stored in the verification information storage area 106 of the delivery target interface module 1000.

Figure 5:
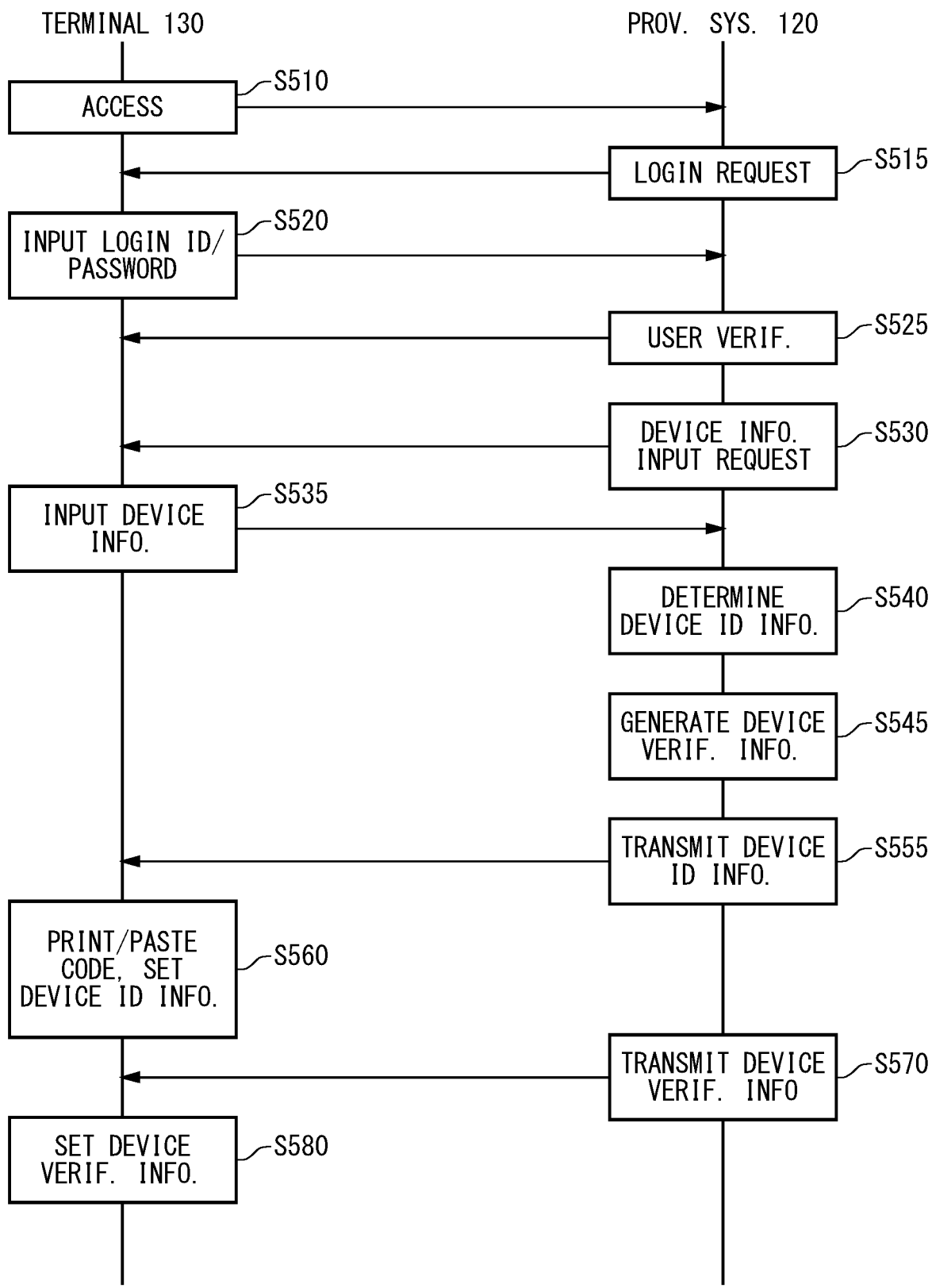
FIG. 5 illustrates a flow of processes to be performed by the provisioning system 120 and the terminal 130 according to the present embodiment.

FIG. 5 illustrates a flow of processes to be performed by the provisioning system 120 and the terminal 130 according to the present embodiment. Note that during this operation, the interface module 1000 may be kept connected with the application module 1001 or may not be connected with the application module 1001. At S510 (Step S510), according to an instruction of the setter, the login processing unit 450 in the terminal 130 accesses the provisioning system 120. At S515, in response to the access of the provisioning system 120, the setter login processing unit 410 in the provisioning system 120 transmits a login screen to the terminal 130, and requests a login process.

At S520, the login processing unit 450 in the terminal 130 receives input of a login ID and a password from the setter, and transmits the login ID and the password to the provisioning system 120. At S525, the setter login processing unit 410 in the provisioning system 120 performs user verification based on the login ID and the password, and, upon successful verification, allows login to the account corresponding to the login ID. Thereafter, processes from S530 to S580 are performed while the setter is logged in.

At S530, the provisioning system 120 transmits, to the terminal 130, a screen for inputting device information about the delivery target interface module 1000, and requests input of the device information. In response to this, at S535, the device information acquiring unit 455 in the terminal 130 receives input to the screen for inputting device information, and acquires the device information about the delivery target interface module 1000. The device information acquiring unit 455 may acquire the device information from the delivery target interface module 1000 by performing communication with the delivery target interface module 1000. The device information transmitting unit 460 transmits the acquired device information to the provisioning system 120.

At S540, the identification information determining unit 415 in the provisioning system 120 receives the device information, and determines device identification information. The identification information determining unit 415 adds the determined device identification information or the like to the device information received from the device information transmitting unit 460, and registers them in the device DB 138. In order to the delivery target interface module 1000 make uniquely identifiable on a network, the identification information determining unit 415 may determine the device identification information by combining information included in device information such as provider identification information unique to the provider of the delivery target interface module 1000, or the serial number of the delivery target interface module 1000, and, as necessary, other information that is sufficient for identifying the delivery target interface module 1000, or may determine the device identification information in another manner.

At S545, the verification information generating unit 425 in the provisioning system 120 generates device verification information about the delivery target interface module 1000, and adds it to the device information in the device DB 138. For example, the verification information generating unit 425 may generate, as the device verification information, a digital certificate electronically signed by the provisioning system 120 for at least part of the device information about the delivery target interface module 1000. For example, the verification information generating unit 425 may generate a digital certificate for making the delivery target interface module 1000 verified by the provisioning system 140 through PKI verification.

At S555, the identification information transmitting unit 435 in the provisioning system 120 transmits the device identification information to the terminal 130. Here, the identification information transmitting unit 435 transmits, to the terminal 130, the device identification information about the delivery target interface module 1000, and the destination information about the provisioning system 140.

At S560, the identification information receiving unit 465 in the terminal 130 receives the device identification information and the like transmitted at S555. The identification information setting unit 470 prints out a code of the device identification information by using the printer 135, and the setter pastes the printed material onto the body or the like of the interface module 1000. In addition, the identification information setting unit 470 sets, for the delivery target interface module 1000, device identification information about the delivery target interface module 1000, and the destination information about the provisioning system 140.

At S570, the verification information transmitting unit 440 in the provisioning system 120 transmits the device verification information about the delivery target interface module 1000. Here, the verification information transmitting unit 440 may transmit a file including the device verification information to the terminal 130. At S580, the verification information receiving unit 475 receives the device verification information, and the verification information setting unit 480 sets the device verification information for the delivery target interface module 1000.

According to the operations of the provisioning system 120 and terminal 130 illustrated above, device identification information that can be acquired from the body or an accessory of the delivery target interface module 1000 at the delivery location, and device verification information for verifying the delivery target interface module 1000 connected to a network at the delivery location can be set through login of the terminal 130 to a provisioning service, and interactions therebetween. Thereby, the delivery target interface module 1000 can be connected to the provisioning system 140 simply and securely in setting processes after delivery.

In the example explained above, the provisioning system 120 and the terminal 130 perform setting processes of the delivery target interface module 1000 through login and the following interactive processes. Instead, without interactive processes, the terminal 130 may automatically transmit provider information and device information to the provisioning system 120, prints out a code received from the provisioning system 120, and write, in the delivery target interface module 1000, device identification information about the delivery target interface module 1000, and destination information about the provisioning system 140 received from the provisioning system 120.

Figure 6:
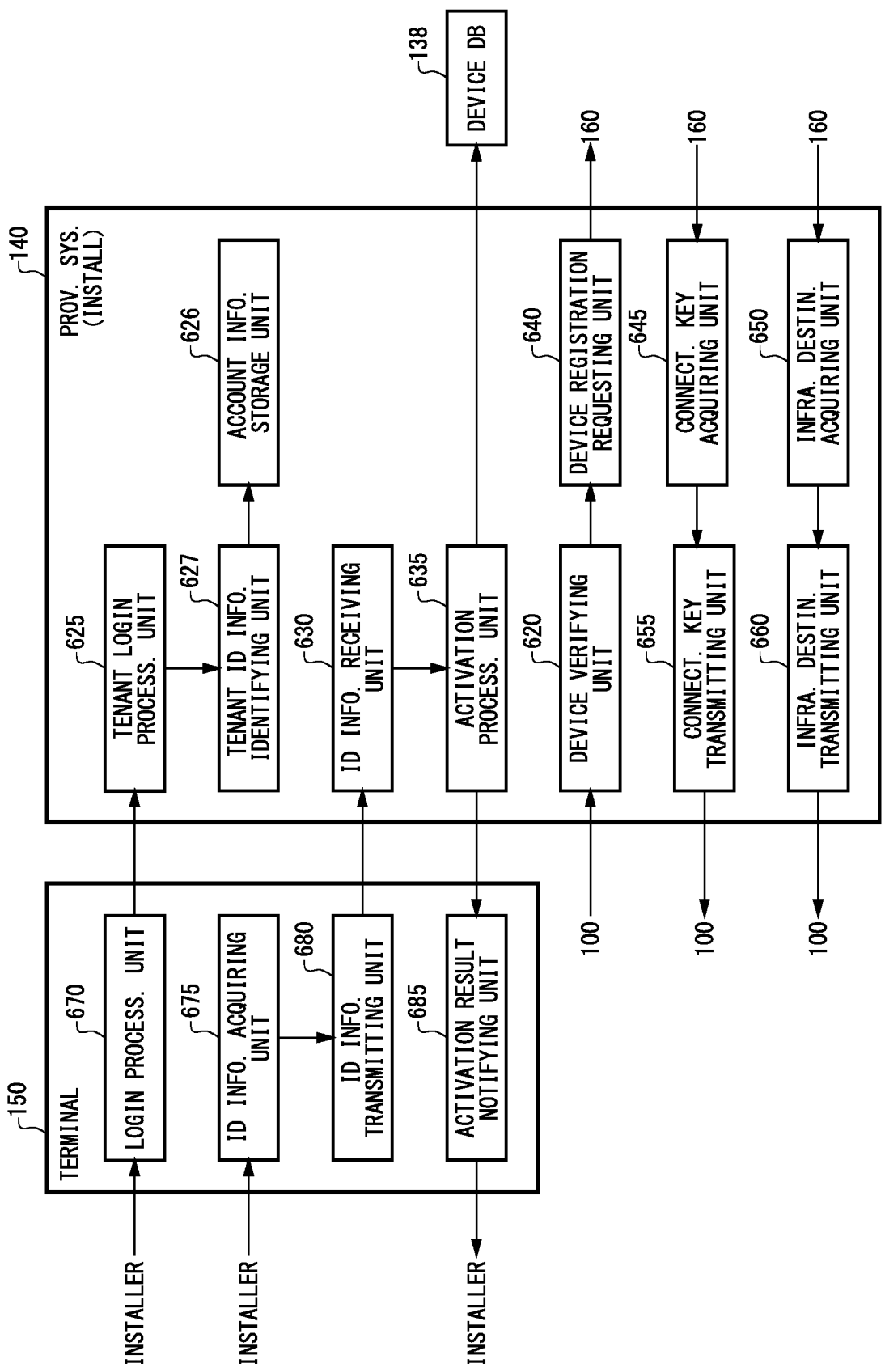
FIG. 6 illustrates the configurations of a provisioning system 140 and a terminal 150 according to the present embodiment.

FIG. 6 illustrates the configurations of the provisioning system 140 and the terminal 150 according to the present embodiment. The provisioning system 140 includes a device verifying unit 620, a tenant login processing unit 625, an account information storage unit 626, a tenant identification information identifying unit 627, an identification information receiving unit 630, an activation processing unit 635, a device registration requesting unit 640, a connection key acquiring unit 645, an infrastructure destination acquiring unit 650, a connection key transmitting unit 655, and an infrastructure destination transmitting unit 660.

By using the device verification information stored in the delivery target interface module 1000, the device verifying unit 620 verifies the delivery target interface module 1000 connected to the network 125 at the delivery location. Upon successful verification of the delivery target interface module 1000, the device verifying unit 620 transmits succeeded verification information indicating the delivery target interface module 1000 has already been verified to the device registration requesting unit 640.

At the delivery location of the delivery target interface module 1000, the tenant login processing unit 625 receives a login request of a tenant corresponding to a user organization of the delivery location from the terminal 150 used by an installer who is a user belonging to the user organization. For each tenant to use services by the infrastructure system 160, the account information storage unit 626 stores tenant identification information, and information about each account belonging to the tenant (in the present embodiment, for example, a login ID and a password). The tenant identification information identifying unit 627 identifies identification information of a logged-in tenant. The identification information receiving unit 630 receives device identification information acquired by the terminal 150 used at the delivery location from the body or an accessory of the delivery target interface module 1000. Upon reception of the device identification information about the delivery target interface module 1000, the activation processing unit 635 performs a process of activating (provisioning) the delivery target interface module 1000 to which the received device identification information is allocated.

The device registration requesting unit 640 transmits, to the infrastructure system 160, the device information about the delivery target interface module 1000 undergoing the activation process, and requests the infrastructure system 160 to register the delivery target interface module 1000 in a network system construction service provided by the infrastructure system 160. The connection key acquiring unit 645 acquires, from the infrastructure system 160, a connection key to be used by the delivery target interface module 1000 for connection to the network system construction service, and transmits the connection key to the connection key transmitting unit 655. The infrastructure destination acquiring unit 650 acquires, from the infrastructure system 160, destination information about the infrastructure system 160 to be used for connection of the delivery target interface module 1000 to the infrastructure system 160, and transmits the destination information to the infrastructure destination transmitting unit 660.

Upon successful verification of the delivery target interface module 1000, the connection key transmitting unit 655 transmits, to the delivery target interface module 1000, the connection key acquired by the connection key acquiring unit 645, and makes the connection key stored in the connection key storage area 108. Upon successful verification of the delivery target interface module 1000, the infrastructure destination transmitting unit 660 transmits, to the delivery target interface module 1000, the destination information acquired by the infrastructure destination acquiring unit 650, and makes the destination information stored in the infrastructure system destination information storage area 116.

The terminal 150 includes a login processing unit 670, an identification information acquiring unit 675, an identification information transmitting unit 680, and an activation result notifying unit 685. According to an instruction of an installer who installs the delivery target interface module 1000 after delivery of the delivery target interface module 1000, the login processing unit 670 performs a process for login to the provisioning system 140.

The identification information acquiring unit 675 acquires device identification information about the delivery target interface module 1000 from the body or an accessory of the delivery target interface module 1000 while the installer belonging to a tenant user organization is logged in. In the present embodiment, the identification information acquiring unit 675 is manipulated by the installer to capture an image of the code label 102 pasted onto the body of the delivery target interface module 1000, and recognizes a code included in the captured image to restore encoded device identification information.

The identification information transmitting unit 680 transmits, to the provisioning system 140, the device identification information acquired by the identification information acquiring unit 675, and requests activation of the delivery target interface module 1000. Note that the destination information about the provisioning system 140 may be registered in the identification information transmitting unit 680 in advance. The activation result notifying unit 685 receives, from the provisioning system 140, a result of activation of the delivery target interface module 1000, and notifies the result to the installer who uses the terminal 150.

Note that although in the present embodiment illustrated as an example, the provisioning system 120 and the provisioning system 140 are different computer systems, the provisioning system 120 and the provisioning system 140 may be realized a single computer system, and a shipment provisioning service and an installation provisioning service may be provided by a single service provider. In such a configuration, basically, each component of the provisioning system 120 in FIG. 4 and the provisioning system 140 in FIG. 6 may be included in the provisioning system.

Figure 7:
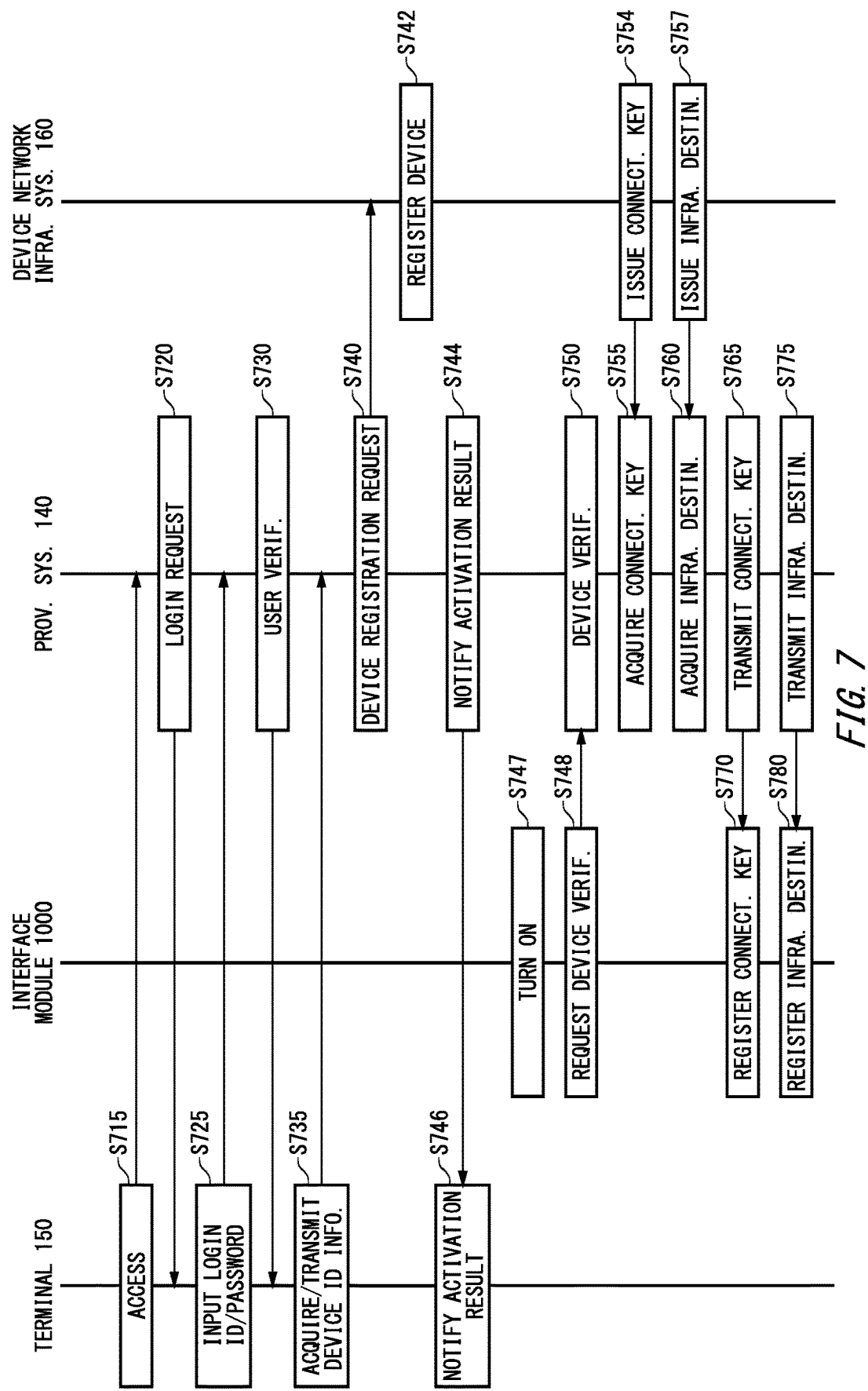
FIG. 7 illustrates a flow of processes to be performed by the terminal 150, an interface module 1000, the provisioning system 140, and an infrastructure system 160 according to the present embodiment.

FIG. 7 illustrates a flow of processes to be performed by the terminal 150, the interface module 1000, the provisioning system 140, and the infrastructure system 160 according to the present embodiment.

At S715, according to an instruction of an installer who is a user belonging to a tenant user organization, the login processing unit 670 in the terminal 150 accesses the provisioning system 140. At S720, in response to the access of the terminal 150, the tenant login processing unit 625 of the provisioning system 140 transmits a login screen to the terminal 150, and requests a login process.

At S725, the terminal 150 receives input of a login ID and a password from the installer belonging to the tenant user organization, and transmits the login ID and the password to the provisioning system 140. At S730, the tenant login processing unit 625 in the provisioning system 140 performs user verification based on the login ID and the password, refers to the account information storage unit 626 upon successful verification, identifies identification information of a tenant to which an account corresponding to the login ID belongs, and allows the tenant to log in. Thereafter, processes from S735 to S775 are performed while the tenant is logged in.

At S735, the identification information acquiring unit 675 in the terminal 150 acquires device identification information about the delivery target interface module 1000. In the present embodiment, the identification information acquiring unit 675 captures an image of the code label 102, and recognizes a code included in the captured image to restore encoded device identification information. The identification information transmitting unit 680 in the terminal 150 transmits, to the provisioning system 140, the device identification information acquired by the identification information acquiring unit 675, and requests activation of the delivery target interface module 1000. Activation of the delivery target interface module 1000 may be activation of the delivery target interface module 1000 as an interface module for the particular tenant logged in at S725.

At S740, the identification information receiving unit 630 in the provisioning system 140 receives an activation request including the device identification information or the like transmitted from the terminal 150. The activation processing unit 635 in the provisioning system 140 performs a process of activating, as an interface module 1000 of the tenant, the delivery target interface module 1000 to which the received device identification information is allocated. The activation processing unit 635 according to the present embodiment adds status information indicating that the delivery target interface module 1000 is undergoing an activation process to device information in the device DB 138 corresponding to the device identification information so as to make the activation process proceed in the provisioning system 140. Provided that the device identification information received from the terminal 150 matches the device identification information included in the device information in the device DB 138, the activation processing unit 635 may start activation of the delivery target interface module 1000. The device registration requesting unit 640 acquires, from the device DB 138, the device information about the delivery target interface module 1000 for which a connection key and destination information about the infrastructure system 160 are not acquired from the infrastructure system 160 since the activation process is under way. The device registration requesting unit 640 transmits the acquired device information to the infrastructure system 160, and requests the infrastructure system 160 to register the delivery target interface module 1000 for a network system construction service provided by the infrastructure system 160. In addition, the device registration requesting unit 640 transmits, to the infrastructure system 160, tenant identification information about a logged-in tenant.

At S742, the infrastructure system 160 that received the device registration request for the delivery target interface module 1000 from the provisioning system 140 registers the device information about the delivery target interface module 1000 in association with tenant identification information. The infrastructure system 160 may notify the provisioning system 140 that the device information is normally registered.

At S744, upon normal completion of the process at S740 (or S740 and S742), the activation processing unit 635 in the provisioning system 140 notifies the terminal 150 of an activation result indicating that the delivery target interface module 1000 could be successfully activated. At S746, the activation result notifying unit 685 in the terminal 150 receives, from the provisioning system 140, the result of activation of the delivery target interface module 1000, and notifies the result to the installer who uses the terminal 150.

At S747, the delivery target interface module 1000 is connected to the network 145, and turned on, and undergoes initialization processes. The process at S747 may be performed while the application module 1001 is kept connected to the interface module 1000. In this case, the network interface 101 of the interface module 1000 may acquire the device information about the application module 1001. Thereafter, processes from S748 to S780 may be performed while the application module is kept connected to the interface module 1000.

At S748, the delivery target interface module 1000 requests the provisioning system 140 to perform a device verification of the delivery target interface module 1000. Specifically, the network interface 101 in the delivery target interface module 1000 accesses the setting storage unit 110 via the access control unit 250, refers to destination information about the provisioning system 140 stored in the provisioning system destination information storage area 114, device identification information stored in the identification information storage area 104, and device verification information stored in the verification information storage area 106, and transmits a device verification request including the device identification information and the device verification information to the provisioning system 140 specified by the destination information read out from the provisioning system destination information storage area 114. Thereby, if the interface module 1000 is connected to a network while it is not verified by the provisioning system 140, a verification request is transmitted to the provisioning system 140. Note that at S748, the network interface 101 may supply the device information about the application module 1001 acquired at Step S747 to the provisioning system 140.

At S750, the device verifying unit 620 in the provisioning system 140 receives the device verification request from the delivery target interface module 1000, and verifies the delivery target interface module 1000 using the device verification information stored in the delivery target interface module 1000. Through PKI verification by using device verification information, the provisioning system 140 according to the present embodiment checks whether or not the delivery target interface module 1000 is a genuine article having undergone a correct shipping process by the provisioning system 120. Upon successful verification of the delivery target interface module 1000, the device verifying unit 620 transmits succeeded verification information to the device registration requesting unit 640. The device registration requesting unit 640 may notify the infrastructure system 160 of the device information about the verified delivery target interface module 1000 along with the verification information. In addition, the provisioning system 140 may supply the infrastructure system 160 with the device information about the application module 1001 received at S748, and make it registered in association with the device information about the delivery target interface module 1000 registered at S742.

At S754, for the delivery target interface module 1000 for whom the device information is registered in the infrastructure system 160 and that is verified by the provisioning system 140, the infrastructure system 160 issues a connection key for connecting the delivery target interface module 1000 to a network system construction service provided by the infrastructure system 160. Thereby, upon successful verification of the interface module 1000 by the provisioning system 140, a connection key is issued. At S757, the infrastructure system 160 issues destination information about the infrastructure system 160 to be used by the delivery target interface module 1000 for a connection to the infrastructure system 160. Note that the configuration and specific operations of the infrastructure system 160 are mentioned below with reference to FIGS. 8 to 9.

At S755, the connection key acquiring unit 645 in the provisioning system 140 acquires the connection key issued by the infrastructure system 160, and transmits the connection key to the connection key transmitting unit 655. At S760, the infrastructure destination acquiring unit 650 in the provisioning system 140 acquires destination information about the infrastructure system 160 from the infrastructure system 160, and transmits the destination information to the infrastructure destination transmitting unit 660.

At S765, the connection key transmitting unit 655 in the provisioning system 140 transmits, to the delivery target interface module 1000, the connection key acquired by the connection key acquiring unit 645. The connection key may be a key for a connection of a particular tenant that is among a plurality of tenants of the infrastructure system 160 and logged in at S725. The connection key transmitting unit 655 may transmit the connection key after encrypting it using a public key of the delivery target interface module 1000 such that the connection key is not acquired in an unauthorized manner by an instrument other than the delivery target interface module 1000. At S770, the connection key receiving unit 166 of the delivery target interface module 1000 receives the connection key transmitted from the provisioning system 140, and makes the access control unit 250 register the connection key in the connection key storage area 108 in the setting storage unit 110.

At S775, the infrastructure destination transmitting unit 660 in the provisioning system 140 transmits the destination information acquired by the infrastructure destination acquiring unit 650 to the delivery target interface module 1000. In addition, the infrastructure destination transmitting unit 660 transmits, to the interface module 1000, verification information for verifying the interface module 1000 as an interface module for a particular tenant that is among a plurality of tenants of the infrastructure system 160 and logged in at S725. At S780, the service connection processing unit 168 of the delivery target interface module 1000 receives the destination information transmitted from the provisioning system 140, and makes the access control unit 250 register the destination information in the infrastructure system destination information storage area of 116 in the setting storage unit 110. In addition, the service connection processing unit 168 registers, in the verification information storage area 106, verification information for verifying the interface module 1000 as an interface module for a particular tenant. Thereby, it becomes possible for the infrastructure system 160 to verify the interface module 1000 as an interface module for a particular tenant. In addition, it becomes possible for the tenant to use the interface module 1000 to utilize at least one service that is among services provided by the infrastructure system 160 and for which the tenant concluded a contract. Note that transmission and registration of the verification information for verifying the interface module 1000 as an interface module for a particular tenant may be executed by the connection key transmitting unit 655 and the connection key receiving unit 166 at S765 and S770.

According to the operations of the interface module 1000 illustrated above, since a verification request is transmitted to the provisioning system 140 upon connection of the interface module 1000 to a network while the interface module 1000 is not verified by the provisioning system 140, it is possible to simplify manipulation for verifying the interface module 1000.

In addition, since upon successful verification of the interface module 1000 by the provisioning system 140, a connection key to be used for communication for making the application module 1001 used as an application module for a particular tenant of the provisioning system 140 is received and stored, it is possible to easily establish a communication for using the application module 1001.

In addition, according to the operations of the provisioning system 140 and the terminal 150 illustrated above, device verification information stored in the delivery target interface module 1000 before delivery is used to verify the delivery target interface module 1000, and an installation provisioning service can be securely provided to the interface module 1000 set by a shipment provisioning service.

Note that the operations explained above may be performed in different processing orders. For example, although it is explained that after the activation of the interface module 1000 at S715 to S746, verification of the interface module 1000 at S757 to S750 is performed to thereby issue a connection key, after the verification of the interface module 1000 at S757 to S750, the activation of the interface module 1000 at S715 to S746 may be performed to thereby issue a connection key.

In addition, although in the operations explained above, device information about the application module 1001 is read out and supplied to the infrastructure system 160 when the delivery target interface module 1000 requests the provisioning system 140 to verify the delivery target interface module 1000, the device information may be supplied at another time. For example, every time the verified interface module 1000 is turned on, the network interface 101 may acquire device information about the application module 1001 and compare it with past device information, and if there are changes in the device information, may supply the device information to the infrastructure system 160.

Figure 8:
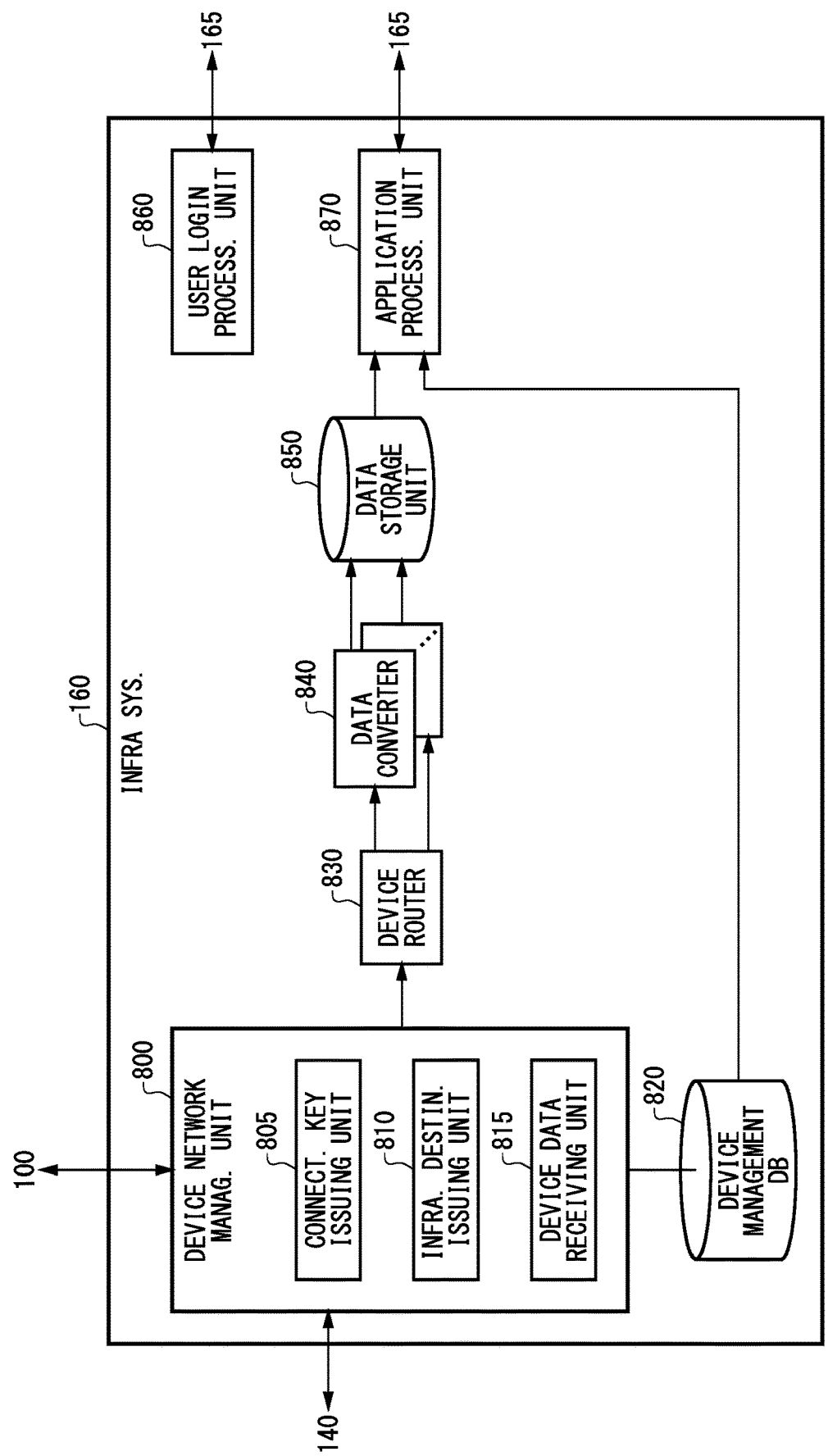
FIG. 8 illustrates the configuration of the infrastructure system 160 according to the present embodiment.

FIG. 8 illustrates the configuration of the infrastructure system 160 according to the present embodiment. The infrastructure system 160 includes a device network managing unit 800, a device management DB 820, a device router 830, one or more data converters 840, a data storage unit 850, a user login processing unit 860, and an application processing unit 870.

The device network managing unit 800 is configured to be connected to the provisioning system 140 and one or more network devices 100 via the network 145, and manage the one or more network devices 100. Upon receiving a device registration request from the infrastructure system 160, the device network managing unit 800 stores, in the device management DB 820, device information about the delivery target interface module 1000 in association with tenant identification information corresponding to a user organization at which the delivery target interface module 1000 is installed. Thereby, since if a particular application module 1001 is attached to the interface module 1000, the application module 1001 can be recognized as an application module for a particular tenant, replacement of application modules 1001 is facilitated. The device network managing unit 800 has a connection key issuing unit 805, an infrastructure destination issuing unit 810, and a device data receiving unit 815. According to a device registration request, the connection key issuing unit 805 issues a connection key for connecting the delivery target interface module 1000 to be newly registered to a network system construction service of the infrastructure system 160, and transmits the connection key to the provisioning system 140. According to the device registration request, the infrastructure destination issuing unit 810 issues destination information about the infrastructure system 160 to be used for connecting the delivery target interface module 1000 to be newly registered to the infrastructure system 160, and transmits the destination information to the provisioning system 140. The device data receiving unit 815 receives data to be used in a network system such as sense data from each of interface modules 1000 in one or more network devices 100 that have already been registered, and supplies the data to the device router 830.

The device management DB 820 is configured to be connected to the device network managing unit 800, and store device information about each interface module 1000 for which a device registration request is received from the provisioning system 140, and device information about the application modules 1001 connected to the interface module 1000, both types of the device information being stored in association with each other. The device router 830 is configured to be connected to the infrastructure destination issuing unit 810, and route, to a data converter 840 that performs target data conversion among one or more data converters 840, data received from each of the interface modules 1000 of the one or more network devices 100 in order to convert the data into a data format to be used in a network system of a tenant. Each of the one or more data converters 840 is configured to be connected to the device router 830, convert the data received from the device router 830 into a target data format, and output the data obtained through the conversion. The data storage unit 850 is configured to be connected to the one or more data converters 840, and store the data after the conversion output by the one or more data converters 840. Although in the present embodiment, for example, the device management DB 820 is provided in the infrastructure system 160 as a separate database from the device DB 138, it may be provided outside the infrastructure system 160 as the same database as the device DB 138.

The user login processing unit 860 is configured to be connected to the terminal 165 used by a user belonging to a tenant user organization or the like via the network 145, and receive a login request for login to an account of the tenant or the like. The application processing unit 870 is configured to be connected to the terminal 165 and the device management DB 820, and provide a development environment of an application that processes data from one or more network devices 100 of the user organization to which a logged-in user or the like belongs. In addition, the application processing unit 870 executes a developed application, and provides a result of the execution to the user of the user organization or the like via the terminal 165.

Figure 9:
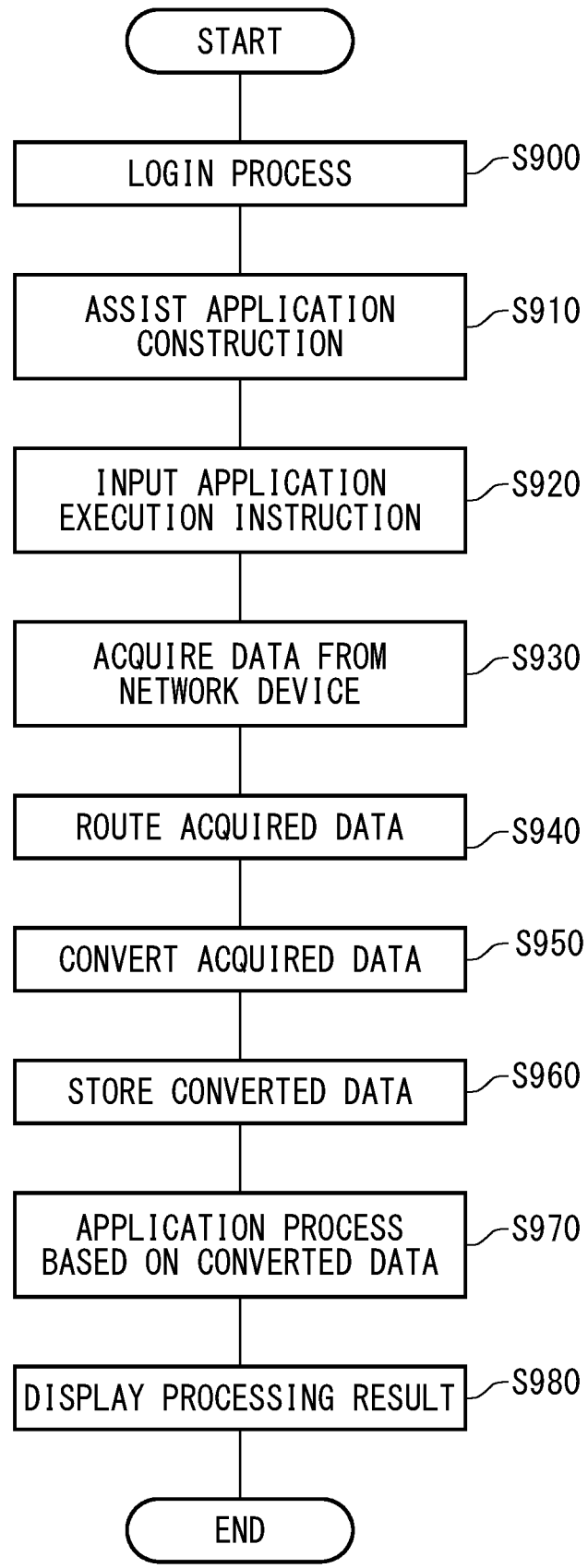
FIG. 9 illustrates a flow of processes to be performed by the infrastructure system 160 according to the present embodiment.

FIG. 9 illustrates a flow of processes to be performed by the infrastructure system 160 according to the present embodiment. Note that before this operation, the interface module 1000 is connected with the application module 1001, and constitutes the network device 100. At S900, the user login processing unit 860 receives a login request from the terminal 165 used by a user belonging to a tenant user organization or the like. The user login processing unit 860 performs user verification based on a login ID and password that are received from the terminal 165, and, upon successful verification, allows login to an account corresponding to the login ID (in the present embodiment, for example, an account belonging to a tenant).

At S910, the application processing unit 870 provides a development environment for an application via the infrastructure system 160, and assists a user of a user organization in development of an application for a network system. For example, the application processing unit 870 provides a development environment where the following operations can be performed: selection of each network device 100 to be used in an application; selection of a data converter 840 to be used for converting data from each network device 100; creation/description of a logic to perform processing/control computation on data from each network device 100; creation/selection of a widget or the like for displaying a processing result of an application on the terminal 165; creation of a display layout of the terminal 165; selection of various types of template; and the like.

At S920, the application processing unit 870 receives an instruction for execution of an application from a user via the terminal 165. At S930, the device network managing unit 800 acquires data from each of a plurality of network devices 100. For example, the device network managing unit 800 may transmit requests to read out data to an interface module 1000 of each network device 100 at periods that are designated in advance, and collect data from each network device 100. Instead, each network device 100 may transmit data to the destination of the infrastructure system 160 registered in the infrastructure system destination information storage area 116 at predetermined periods, and the device network managing unit 800 may receive the data transmitted from an interface module 1000 of each network device 100. Here, an interface module 1000 of each network device 100 may encrypt data by using a private key provided to each interface module 1000, and transmit the encrypted data to the infrastructure system 160, and the device network managing unit 800 may decrypt the data from the interface module 1000 by using a public key of the interface module 1000, and acquire the data. Thereby, it is possible to prevent interception of sense data transmitted by each interface module 1000.

At S940, the device router 830 routes the data received from each network device 100 to a data converter 840 allocated to the network device 100. At S950, the data converter 840 having received the data from the network device 100 performs data conversion corresponding to the data converter 840. Such data conversion may be conversion of data from network devices 100 into certain data formats as requested by applications to be executed by the application processing unit 870, such as, for example, conversion of a temperature data value acquired from a temperature sensor into a data format representing a Celsius degree, or smoothing/integration/differentiation and the like of sense data acquired from sensors. The data converter 840 may allocate data storage destinations such that the converted data is stored for each piece of tenant identification information. For example, data from a network device 100 may additionally include device identification information so as to indicate from where the data is transmitted, and a data converter 840 extracts tenant identification information corresponding to the device identification information from the device management DB 820, selects different data storage destinations for different tenants, and outputs converted data to the data storage unit 850. The data converter 840 may output device identification information along with the converted data.

At S960, data obtained by conversion by the data converter 840 is stored in the data storage unit 850. The data storage unit 850 may store the converted data as data ordered in a temporal order for each network device 100. If device identification information is output from the data converter 840, the data storage unit 850 may store the identification information in association with data. At S970, the application processing unit 870 performs an application process by using data stored in the data storage unit 850 according to an algorithm or the like implemented in an application being executed. If data of a particular network device 100 is to be used, the application processing unit 870 reads out data corresponding to the device identification information. For example, the application processing unit 870 may extract, from the device management DB 820, tenant identification information corresponding to device identification information about a designated network device 100, and read out data from a data storage destination associated with a tenant of the tenant identification information.

At S980, the application processing unit 870 outputs a display screen to display a processing result of an application to the terminal 165, and makes the terminal 165 display the processing result to a user of the terminal 165. Depending on the contents of an application, the application processing unit 870 outputs updated display screens to the terminal 165 consecutively according to data from each network device 100 that changes over time.

According to the operations of the infrastructure system 160 illustrated above, connection keys for connection to a network system construction service are distributed to delivery target interface modules 1000 securely installed by using a provisioning service by the provisioning system 120 and the provisioning system 140. Thereby, the infrastructure system 160 can prevent connection of unauthorized network devices 100 to the network system construction service, and can provide a secure application development/execution environment.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 10:
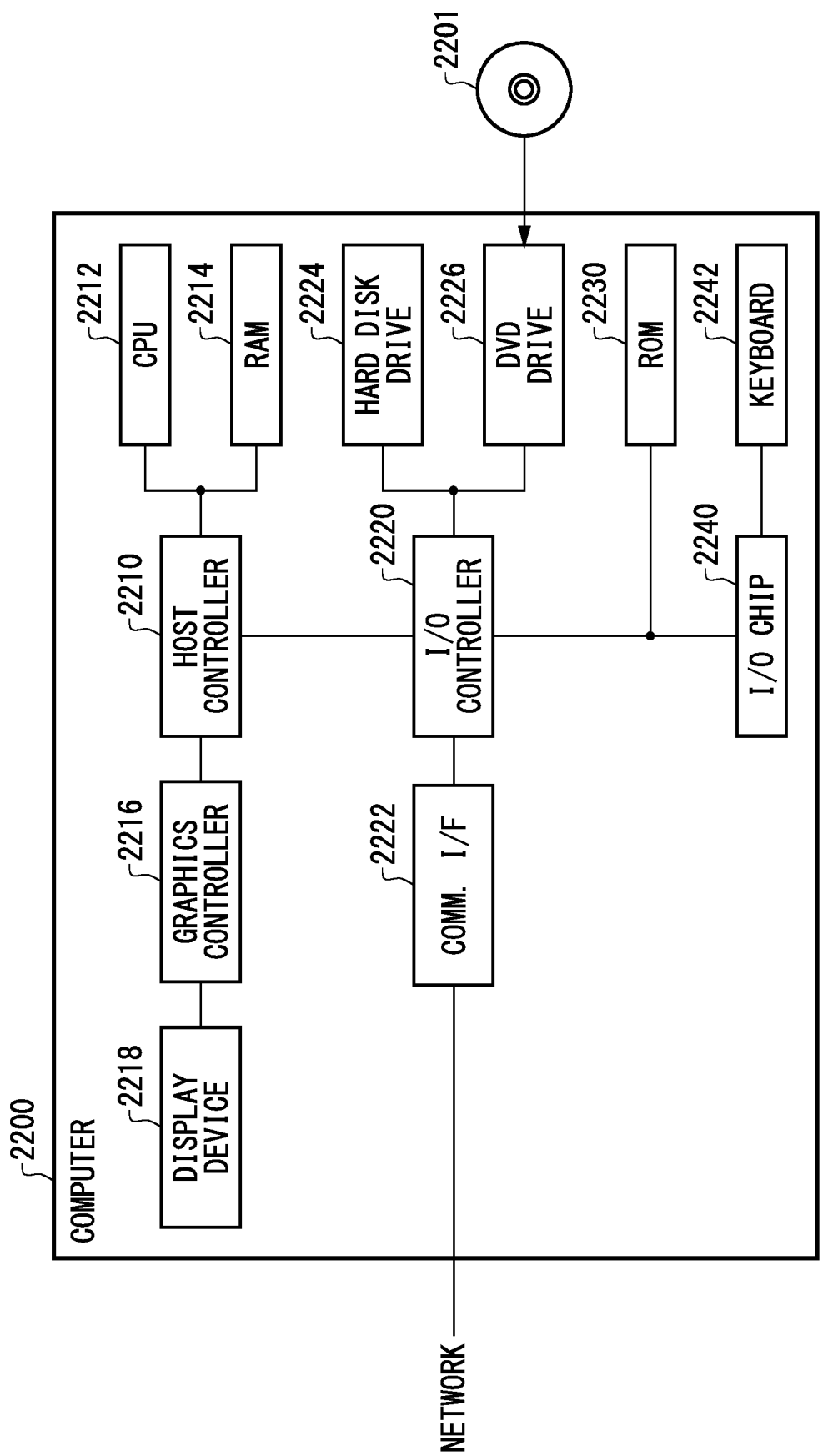
FIG. 10 illustrates an exemplary configuration of a computer 2200 according to the present embodiment.

FIG. 10 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: device provisioning environment; 100: network device; 101: network interface; 102: code label; 104: identification information storage area; 106: verification information storage area; 108: connection key storage area; 110: setting storage unit; 114: provisioning system destination information storage area; 116: infrastructure system destination information storage area; 120: provisioning system; 125: network; 130: terminal; 135: printer; 140: provisioning system; 145: network; 150: terminal; 160: infrastructure system; 162: storage processing unit; 164: verification processing unit; 165: terminal; 166: key receiving unit; 168: service connection processing unit; 220: sensor; 230: communication unit; 240: data storage unit; 250: access control unit; 410: setter login processing unit; 415: identification information determining unit; 425: verification information generating unit; 435: identification information transmitting unit; 440: verification information transmitting unit; 450: login processing unit; 455: device information acquiring unit; 460: device information transmitting unit; 465: identification information receiving unit; 470: identification information setting unit; 475: verification information receiving unit; 480: verification information setting unit; 620: device verifying unit; 625: tenant login processing unit; 626: account information storage unit; 627: tenant identification information identifying unit; 630: identification information receiving unit; 635: activation processing unit; 640: device registration requesting unit; 645: connection key acquiring unit; 650: infrastructure destination acquiring unit; 655: connection key transmitting unit; 660: infrastructure destination transmitting unit; 670: login processing unit; 675: identification information acquiring unit; 680: identification information transmitting unit; 685: activation result notifying unit; 250: access control unit; 800: device network managing unit; 805: connection key issuing unit; 810: infrastructure destination issuing unit; 815: device data receiving unit; 820: device management DB; 830: device router; 840: data converter; 850: data storage unit; 860: user login processing unit; 870: application processing unit; 1000: interface module; 1001: application module; 10000: case; 10001: communication connector; 10002: power source connector; 10004: protruding portion; 10010: case; 10011: communication connector; 10012: power source connector; 10013: input/output connector; 10014: opening portion; 10015: seat; 10016: threaded hole portion; 10017: attachment tap; 10018: threaded portion; 10019: magnet; 10020: attachment surface; 2200: computer; 2201: DVD-ROM; 2210: host controller; 2212: CPU; 2214:

RAM; 2216: graphics controller; 2218: display device; 2220: input/output controller; 2222: communication interface; 2224: hard disk drive; 2226: DVD-ROM drive; 2230: ROM; 2240: input/output chip; 2242: keyboards

What is claimed is:

1. An interface module connectable to an application module having at least one of a sensor, an actuator, an input port, an output port, an input/output port, and a user interface, the interface module comprising:
   an interface module case;
   an interface module-side communication connector mounted in the interface module case and connectable to an application module-side communication connector provided to the application module;
   a network interface in the interface module case configured to be connected to a network;
   a verification information storage unit in the interface module case that stores verification information for verifying, irrespective of a connected application module, the interface module connected to the network as an interface module for a preset particular tenant among a plurality of tenants of a server computer system configured to be connected to the network; and
   a verification processing unit configured to send the verification information stored in the verification information storage unit to the server computing system.

2. The interface module according to claim 1, wherein the verification processing unit is configured to, upon connection of the interface module to the network while the interface module is not verified by the server computing system, transmits a verification request of the interface module to the server computing system, and makes the interface module verified by the server computing system.

3. The interface module according to claim 2, wherein
   upon successful verification of the interface module by the server computing system, the network interface receives a connection key to be used for communication for making the application module used as an application module for the particular tenant of the server computing system, and
   the interface module further comprises a connection key storage unit that stores the connection key.

4. The interface module according to claim 1, further comprising an identification information providing unit that is provided to a body or an accessory of the interface module, and provides identification information about the interface module in such a manner that a terminal that activates the interface module as the interface module for the particular tenant can acquire the identification information.

5. The interface module according to claim 4, wherein the identification information providing unit is a code label having thereon a printed code including the identification information.

6. The interface module according to claim 1, further comprising an application module case that mates with the interface module case, the application module case including an application module-side communication connector mounted in the application module case to connect to the interface module-side communication connector in the interface module case.

7. The interface module according to claim 6, wherein circumferential shapes of connection surfaces of the interface module case and the application module case are identical.

8. The interface module according to claim 1, comprising an interface module-side power source connector that is connectable to an application module-side power source connector provided to the application module, and enable supply of electrical power between the application module and the interface module.

9. A network device comprising:
   the interface module according to claim 1; and
   the application module that can be connected to the interface module.

10. The network device according to claim 9, wherein the application module has an input/output connector for performing communication directly with the application module bypassing the interface module.

11. The network device according to claim 9, wherein the application module has an attachment surface on a surface opposite to a surface on which the application module is connected with the interface module, the attachment surface being a surface for attaching the application module to an installation location.

12. The network device according to claim 11, wherein the application module has:
   an application module case;
   an attachment tap provided with the attachment surface; and
   a seat that is interposed between the attachment tap and the application module case, and fixes the attachment tap to the application module case.

13. The network device according to claim 11, wherein a magnet, a threaded hole, or a double-sided tape for attaching the application module to an installation location is provided at the attachment surface.

14. A network system comprising:
   a plurality of interface modules, each of which is the interface module according to claim 1; and
   the server computing system configured to be connected to each of the plurality of interface modules via the network.

* * * * *